US007215868B2

(12) United States Patent
Shimazu et al.

(10) Patent No.: US 7,215,868 B2
(45) Date of Patent: May 8, 2007

(54) APPARATUS FOR TIGHTLY FIXING AN OPTICAL CONNECTOR TO AN OPTICAL CABLE

(75) Inventors: Hideto Shimazu, Tokyo (JP); Akihiro Onogawa, Tokyo (JP); Yuichi Koreeda, Tokyo (JP); Haruyuki Koshimizu, Tokyo (JP); Toshifumi Takagi, Tokyo (JP); Kiyoyuki Mutaguchi, Tokyo (JP); Kiyokazu Fukudome, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/288,867

(22) Filed: Nov. 29, 2005

(65) Prior Publication Data

US 2006/0115229 A1 Jun. 1, 2006

(30) Foreign Application Priority Data

Nov. 29, 2004 (JP) ............................ 2004-343606

(51) Int. Cl.
*G02B 6/00* (2006.01)
*G02B 6/26* (2006.01)
*G02B 6/42* (2006.01)
*G02B 6/36* (2006.01)

(52) U.S. Cl. .......................... 385/137; 385/15; 385/53; 385/76; 385/88

(58) Field of Classification Search .................. 385/53, 385/55, 70, 72, 76–78, 88, 134, 136, 137, 385/139, 15
See application file for complete search history.

(56) References Cited

U.S. PATENT DOCUMENTS 5,636,310 A * 6/1997 Walles ........................ 385/139

FOREIGN PATENT DOCUMENTS

| | | |
|---|---|---|
| JP | 61-2606 | 9/1986 |
| JP | 62-87911 | 4/1987 |
| JP | 6170949 | 6/1994 |
| JP | 07-77630 | 3/1995 |
| JP | 2590067 | 5/1996 |

* cited by examiner

*Primary Examiner*—Frank G. Font
*Assistant Examiner*—Jerry Martin Blevins
(74) *Attorney, Agent, or Firm*—Collard & Roe, P.C.

(57) ABSTRACT

In a fixing apparatus for fixing an optical connector to an optical cable having an optical fiber and wire members arranged around the optical fiber, the fixing apparatus includes first, second, and third holding members. The first holding member is adapted to be inserted between the wire member and the optical fiber. The second holding member is adapted to be disposed outside the wire members, the second holding member cooperating with the first holding member to tightly hold the wire members therebetween. The third holding member surrounding the second holding member and having an axial end portion adapted to be engaged with the second holding member in a rotation direction with respect to the optical cable. In addition, the third holding member has another axial end portion adapted to be connected to the optical connector.

9 Claims, 5 Drawing Sheets

1 X 6 6d 6b 6a 5c 1a 3 7f 4 7e 7 6e 7g 6c 7d 5 2 6d 7c 7e 7a 7h X 7d 7b

APPARATUS FOR TIGHTLY FIXING AN OPTICAL CONNECTOR TO AN OPTICAL CABLE

This application claims priority to prior Japanese application JP 2004-343606, the disclosure of which is incorporated herein by reference.

BACKGROUND OF THE INVENTION

This invention relates to an apparatus for use in fixing or connecting an optical connector to an optical connector.

Japanese Unexamined Patent Application Publication (JP-A) No. H6-170949 (Patent Document 1) discloses a method of fixing a terminal end of a FRP (fiber-reinforced plastic) rod to a terminal fixture. The FRP rod is inserted into a hole of a conical member. The FRP rod and the conical member are adhered by an adhesive. The FRP rod and the conical member adhered to each other are fixed along a tapered portion of the terminal fixture. The conical member has a shape matching the shape of a tapered inner surface of the terminal fixture.

Japanese Patent (JP-B) No. 2590067 (Patent Document 2) discloses a cable retaining structure for fixing a terminal end portion of an optical cable. The cable retaining structure has a core metal having one end connected to a retainer. The core metal has an outer peripheral surface provided with a corrugated portion. Specifically, the outer peripheral surface is corrugated in a longitudinal direction of the cable to form two or more valley portions. The core metal has a center hole through which the cable is inserted. An armoring wire of the cable is deformed in conformity with a surface profile of the corrugated portion and laid along the outer peripheral surface of the core metal. Further, on the armoring wire, snap rings are attached at the valley portions of the corrugated portion.

In each of the patent documents 1 and 2, the FRP rod or the cable is not restricted in relative movement in a rotating direction and in an axial direction. In actual use, an external force is exerted in the rotating direction and in the axial direction in order to lay the FRP rod or the cable. Therefore, it is impossible to achieve reliable fixation of the FRP rod or a reliable cable retaining structure.

Further, in the patent documents 1 and 2, no disclosure is made of a structure for positioning the FRP rod or the cable in the axial direction when the FRP rod or the cable is connected to an optical connector.

SUMMARY OF THE INVENTION

It is therefore an object of this invention to provide a fixing apparatus for fixing or connecting an optical connector to an optical cable, which is capable of controlling a position of the optical connector with respect to the optical cable.

It is another object of this invention to provide the fixing apparatus of the type described, which is highly reliable.

Other object of the present invention will become clear as the description proceeds.

According to an aspect of the present invention, there is provided a fixing apparatus for fixing an optical connector to an optical cable having an optical fiber and wire members arranged around the optical fiber, the fixing apparatus comprising a first holding member adapted to be inserted between the wire members and the optical fiber, a second holding member adapted to be disposed outside the wire member, the second holding member cooperating with the first holding member to tightly hold the wire members therebetween, and a third holding member surrounding the second holding member and having an axial end portion adapted to be engaged with the second holding member in a rotation direction with respect to the optical cable, the third holding member having another axial end portion adapted to be connected to the optical connector.

DESCRIPTION OF THE PREFERRED EMBODIMENT

Now, an embodiment of this invention will be described.

Figure 1:
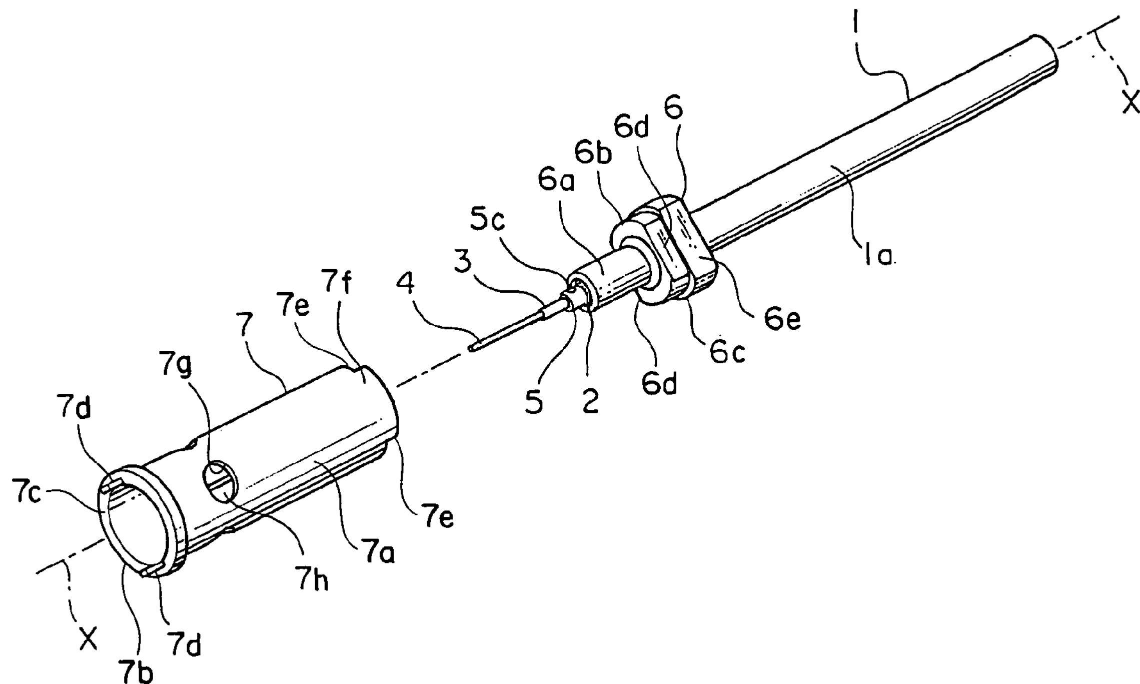
FIG. 1 is an exploded perspective view showing a fixing apparatus according to an embodiment of this invention together with an optical cable.
Figure 2:
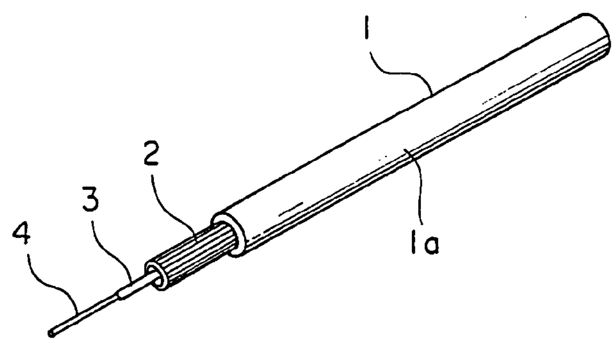
FIG. 2 is a perspective view of the optical cable illustrated in FIG. 1.

Referring to FIGS. 1 and 2, an optical cable 1 comprises an insulator 1*a* as an outer sheath, a wire member 2 disposed inside the insulator 1*a*, a tubular member 3 disposed inside the wire member 2, and an optical fiber 4 disposed inside the tubular member 3. In other words, the optical cable 1 is formed by covering the optical fiber 4 with the tubular member 3, covering the tubular member 3 with the wire member 2, and covering the wire member 2 with the insulator 1*a*.

The wire member 2 in this embodiment comprises a plurality of thin steel wires bundled into a tubular shape. The tubular member 3 comprises a stainless steel pipe.

Figure 3:
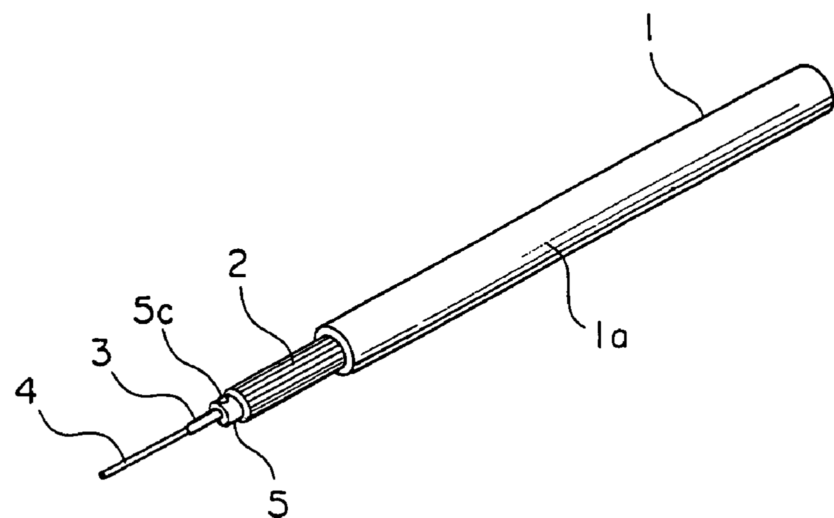
FIG. 3 is a perspective view of the optical cable illustrated in FIG. 2 and a first holding member attached thereto.
Figure 4:
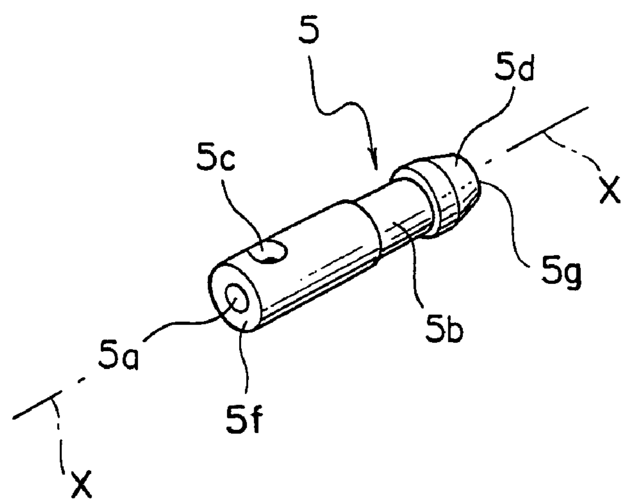
FIG. 4 is a perspective view of the first holding member illustrated in FIGS. 1 and 2.

A fixing apparatus according to an embodiment of this invention comprises a first holding member 5 interposed between the wire member 2 and the tubular member 3, a second holding member 6 through which the optical fiber 4, the tubular member 3, and the wire member 2 are inserted, and a third holding member 7 of a generally tubular shape locked with the second holding member 6. The first holding member 5 is a component generally called a core. As shown in FIGS. 3 and 4 also, the first holding member 5 has a through hole 5*a* penetrating therethrough along an axis X extending in an axis direction (see FIGS. 1 and 4), a recessed portion 5*b* formed on its outer peripheral surface, and a fixing portion 5*c* penetrating therethrough between the outer peripheral surface and the through hole 5*a*.

The through hole 5*a* penetrates the first holding member 5 between one end face 5*f* and the other end face 5*g* perpendicular to the axis X and located at opposite ends in the axis direction. The through hole 5*a* has an inner diameter slightly greater than an outer diameter of the tubular member 3 of the optical cable 1. A terminal end portion of the optical fiber 4 and the tubular member are inserted into the through hole 5*a*.

The recessed portion 5*b* is formed near the other end face 5*g* of the first holding member 5 along the outer peripheral surface to extend around the axis X.

The fixing portion 5*c* has a hole penetrating therethrough between the outer peripheral surface of the first holding member 5 and the through hole 5*a*. The fixing portion 5*c* is located near the one end face 5*f*.

As shown in FIG. 3, the first holding member 5 is partly inserted into a gap between the wire member 2 and the tubular member 3. In detail, a part of the first holding member 5 between the other end face 5*g* and a position slightly beyond the recessed portion 5*b* is inserted. The one end face 5*f* and the fixing member 5*c* of the first holding member 5 are located outward of an end of the wire member 2 and exposed.

The outer peripheral surface of the first holding member 5 is provided with a conical tapered surface 5*d* tapered from the vicinity of the recessed portion 5*b* towards the other end face 5*g* in the axis direction.

The second holding member 6 serves to hold one end of the optical cable 1. As shown in FIG. 1, the second holding member 6 has a tubular securing portion 6*a* for securing an outer peripheral surface of the wire member 2 of the optical cable 1, a flange portion 6*b* formed at the other end of the securing portion 6*a* to be integral with the securing portion 6*a*, and a locking flange portion 6*c* integrally formed at the other end face of the flange portion 6*b*. Herein, “one end” and “the other end” of each component are an end (leftward end in the figures) on the side of one end of the optical cable 1 and another end (rightward end in the figures) on the side of the other end of the optical cable.

Through the tubular securing portion 6*a*, the wire member 2 is inserted. Each of the flange portion 6*b* and the locking flange portion 6*c* has a through hole (not shown), similar to the securing portion 6*a*, through which the wire member 2 is inserted. Each of the flange portion 6*b* and the locking flange portion 6*c* has an outer peripheral surface greater in size than a diameter of the securing portion 6*a*. The outer peripheral surface of the flange portion 6*b* is provided with a pair of flat flange surfaces 6*d*. The outer peripheral surface of the locking flange portion 6*c* is provided with a pair of flat locking flange surfaces 6*e*. In FIG. 1, one of the flange surfaces 6*d* and one of the locking flange surfaces 6*e* are shown. Although not shown in FIG. 1, the other flange surface 6*d* and the other locking flange surface 6*e* are formed at positions opposite to the illustrated ones.

The flange surfaces 6*d* are flat surfaces parallel to the axis X and parallel to each other. The locking flange surfaces 6*e* are flat surfaces parallel to the axis X and parallel to each other. The flange portion 6*b* is slightly smaller in maximum size in a radial direction than the locking flange portion 6*c*.

Figure 5:
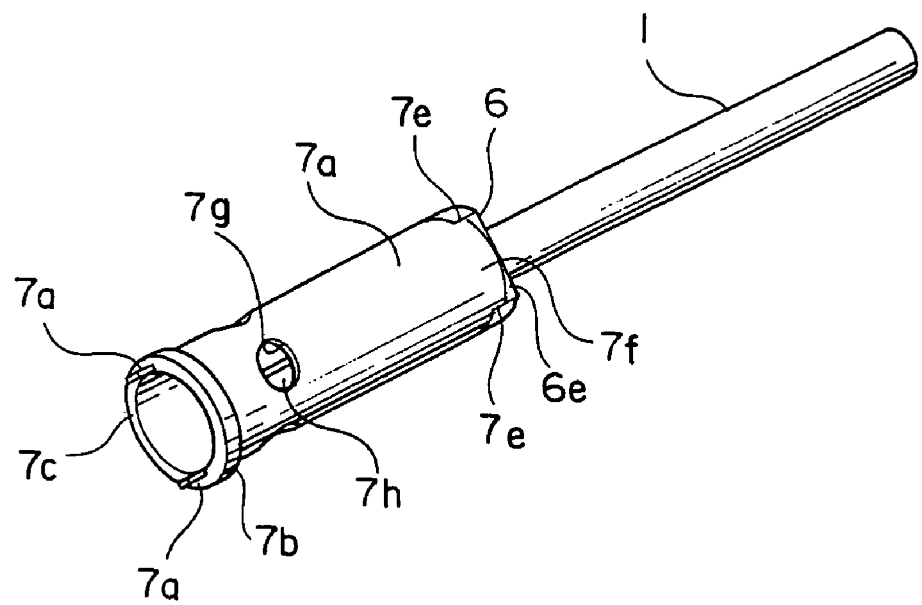
FIG. 5 is a perspective view showing a state where the fixing apparatus illustrated in FIG. 1 is connected to the optical cable.

As shown in FIGS. 1 and 5, the third holding member 7 has a tubular third holding portion 7*a*, an annular flange portion 7*b* formed at one end in the axis direction, and a pair of pin-like engaged portions 7*d* protruding from one end face 7*c* of the flange portion 7*b* in the axis direction. The third holding portion 7*a* is provided with a pair of cutout portions 7*e* formed at the other end in the axis direction by cutting the other end in a circumferential direction and in the axis direction, a pair of locked portions 7*f* formed between the cutout portions 7*e*, and an opening portion 7*g* formed near the flange portion 7*b*.

The locked portions 7*f* are flush with a peripheral surface of the third holding portion 7*a* and extend towards the other end in the axis direction. The opening portion 7*g* penetrates the third holding portion 7*a*. The opening portion 7*g* has an inner wall surface provided with a thread (not shown) for removably attaching a cap or screw plug 7*h* for closing the opening portion 7*g*.

Hereinafter, description will be made of an assembling operation for fixing the optical cable 1 by the fixing apparatus.

As shown in FIG. 2 also, the wire member 2 is exposed by removing a part of the insulator 1*a* at the one end of the optical cable 1. The tubular member 3 is exposed by removing one end of the wire member 2. The terminal end portion of the optical fiber 4 extends through the tubular member 3 to the one end in the axis direction. As shown in FIG. 3, the optical fiber 4 and the tubular member 3 are inserted into the through hole 5*a*.

Between the wire member 2 and the tubular member 3, a part of the first holding member 5 from the other end face 5*g* to the recessed portion 5*b* is inserted. Since the tapered surface 5*d* is formed at the other end face 5*g* of the first holding member 5, the first holding member 5 is easily inserted between the wire member 2 and the tubular member 3.

After the first holding member 5 is inserted between the wire member 2 and the tubular member 3, the first holding member 5 and the tubular member 3 are fixed by utilizing the fixing portion 5*c* of the first holding member 5. As shown in FIG. 3, the fixing portion 5*c* is located at a part exposed out of the end of the wire member 2. By supplying an adhesive as a fixing member to the fixing portion 5*c*, the wire member 2 and the first holding member 5 are adhered to each other. Alternatively, the first holding member 5 and the tubular member 3 may be fixed by supplying a solder to the fixing portion 5*c*.

Then, into the securing portion 6*a* and the through holes of the flange portion 6*b* and the locking flange portion 6*c*, the wire member 2 of the optical cable 1 with the first holding member 5 inserted therein (FIG. 3) is inserted so that the wire member 2 is held by the second holding member 6 on its outer peripheral surface.

Inside the securing portion 6*a*, the recessed portion 5*b* of the first holding member 5 is located to face an inner surface of the securing portion 6*a* via the wire member 2. With the securing portion 6*a* being deformed inwardly towards the recessed portion 5*b* of the first holding member 5, the wire member 2 is fixedly attached to the recessed portion 5*b*. Therefore, the recessed portion 5*b* of the first holding member 5 fixedly secures the wire member 2 of the optical cable 1 in cooperation with the securing portion 6*a* of the second holding member 6.

Figure 6:
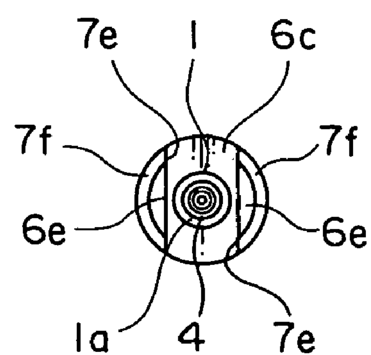
FIG. 6 is a right side view of the state illustrated in FIG. 5.

Next, as shown in FIGS. 5 and 6, the second holding member 6 and the third holding member 7 are engaged with each other. The flange portion 6*b* of the second holding member 6 is inserted into the third holding portion 7*a* of the third holding member 7. Then, the locking flange portion 6*c* of the second holding member 6 is inserted into the cutout portions 7*e* of the third holding member 7. The locking flange portion 6*c* is locked by bringing the locking flange surfaces 6*e* of the second holding member 6 into contact with the locked portions 7*f* of the third holding member 7. At this time, arc-shaped portions of the locking flange portion 6*c* are fitted to the cutout portions 7*e*.

When the second holding member 6 and the third holding member 7 are engaged with each other, the locking flange surfaces 6*e* and the locked portions 7*f* are locked in a rotating direction around the axis X so that relative rotation around the axis X is controlled.

The third holding member 7 is provided with an opening portion 7*g* formed at a part of its outer peripheral surface. The opening portion 7*g* is designed so as to easily observe an internal state immediately after the second and the third holding members 6 and 7 are assembled. The opening portion 7*g* may be sealed by a screw cap 7*h* after observing the internal state immediately after assembling the second and the third holding members 6 and 7.

Figure 7:
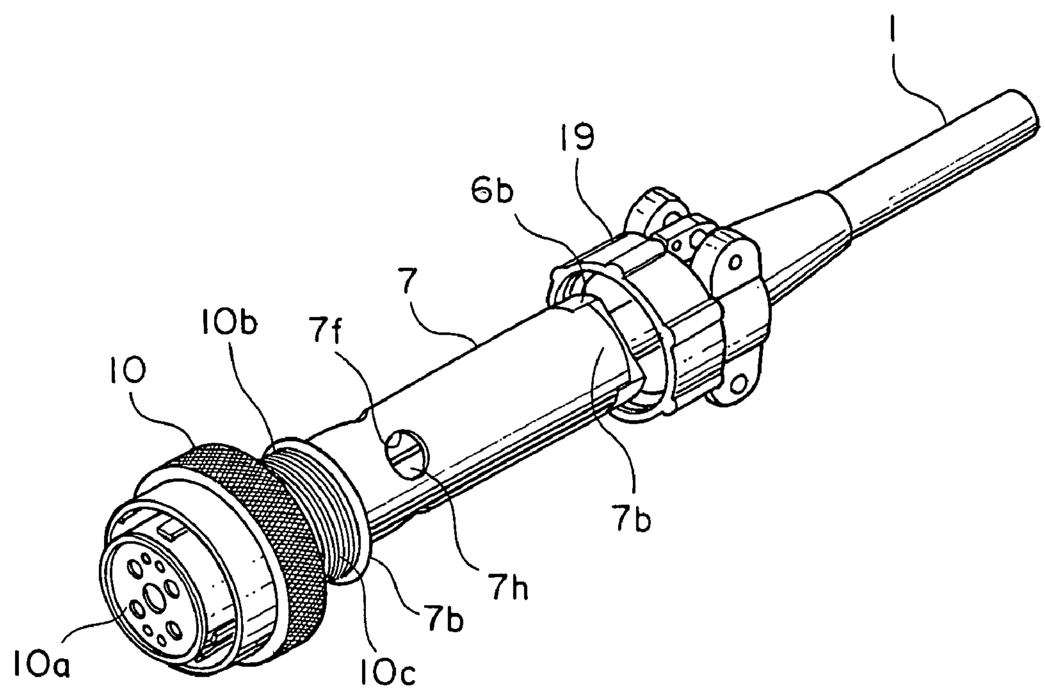
FIG. 7 is a perspective view showing a state where the fixing apparatus is connected to an optical connector.
Figure 8:
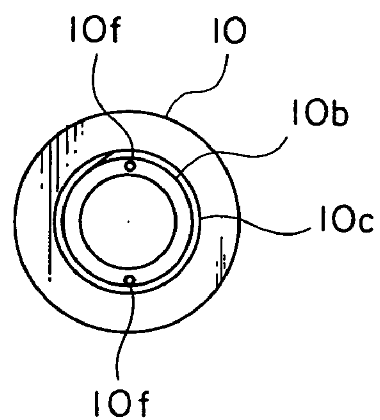
FIG. 8 is a right side view of the optical connector illustrated in FIG. 7.

In FIG. 7, the fixing apparatus with the optical cable 1 fixed thereto is connected to an optical connector 10. In FIG. 8, the optical connector 10 is seen from the other end in the axis direction.

Referring to FIGS. 7 and 8, the optical connector 10 is connected to the optical fiber 4 of the optical cable 1 with the fixing apparatus fixed thereto as shown in FIGS. 5 and 6. The optical connector 10 has a coupling portion 10*a* removably coupled to a mating optical connector (not shown), and a tubular connector fixing portion 10*b* formed on an opposite side to the coupling portion 10*a* and extending towards the other end in the axis direction. The connector fixing portion 10*b* has an end face provided with a pair of engaging portions 10*f* for inserting and locking the engaged portions 7*d* of the third holding member 7 shown in FIG. 5. The engaged portions 7*d* are inserted into the engaging portions 10*f*.

By engagement between the engaging portions 10*f* of the optical connector 10 and the engaged portions 7*d* of the third holding member 7, the optical connector 10 and the third holding member 7 are controlled in relative rotation and the optical connector 10 is positioned in the axis direction.

Figure 9:
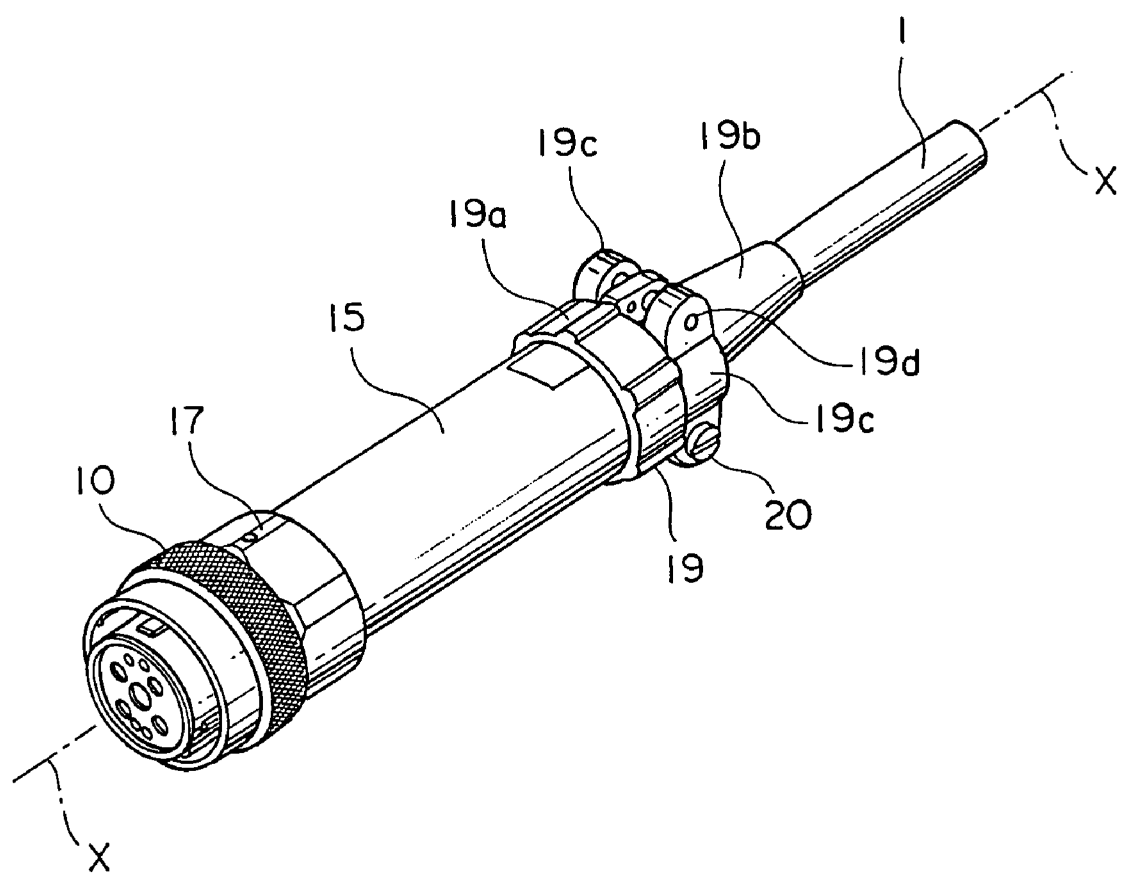
FIG. 9 is a perspective view showing a state where a shell member is coupled to the fixing apparatus illustrated in FIG. 7.

By removing the screw cap 7*h* from the third holding member 7 shown in FIG. 7, the internal state of the third holding member 7 is easily observed through the opening portion 7*g*. The connector fixing portion 10*b* has an outer peripheral surface provided with a thread 10*c*. The connector fixing portion 10*b* and the third holding member 7 locked with each other is covered with a tubular shell member 15 shown in FIG. 9.

The other end of the shell member 15 in the axis direction is fixed by a fitting member 19. The fitting member 19 has a ring-shaped fitting portion 19*a*, a cable insert portion 19*b* extending from the fitting portion 19*a* towards the other end in the axis direction, a pair of clamping portions 19*c* for clamping the optical cable 1, a pin-like connecting portion 19*d* connecting between one ends of the clamping portions 19*c*, and a screw 20 connecting between the other ends of the clamping portions 19*c*.

The fitting portion 19*a* is fitted to the shell member 15 to cover the other end of the shell member 15. The optical cable 1 is inserted through the cable insert portion 19*b*. The clamping portions 19*c* are located opposite to each other to clamp the cable insert portion 19*b*. The screws 20 are tightened to clamp the cable insert portion 19*b* by the clamping portions 19*c*.

The one end of the tubular shell member 15 is tightened by a nut 17 to be fixed to the optical connector 10. As described above, the other end of the shell member 15 in the axis direction is held by the fitting member 19 with the optical cable 1 inserted therein. Thus, the shell member 15 is held between the optical connector 10 and the fitting member 19 in the axis direction.

While this invention has thus far been described in conjunction with the preferred embodiment thereof, it will readily be possible for those skilled in the art to put this invention into practice in various other manners.

What is claimed is:

1. A fixing apparatus for fixing an optical connector to an optical cable having an optical fiber and wire members arranged around the optical fiber, the fixing apparatus comprising:

a first holding member adapted to be inserted between the wire member and the optical fiber;

a second holding member adapted to be disposed outside the wire members, the second holding member cooperating with the first holding member to tightly hold the wire members therebetween; and a third holding member surrounding the second holding member and having an axial end portion adapted to be engaged with the second holding member in a rotation direction with respect to the optical cable, the third holding member having another axial end portion adapted to be connected to the optical connector, wherein the first holding member has:

a through hole for receiving the optical fiber penetrating therethrough;

a recessed portion placed between the wire members and the optical fiber to face the wire members; and a fixing portion for fixing the first holding member to the optical cable, the second holding member having a securing portion for securing the wire members, the recessed portion and the securing portion clamping the wire members to secure the wire members to the securing portion.

2. The fixing apparatus according to claim 1, wherein the through hole penetrates the first holding member between one end face and the other end face thereof in an axis direction of the optical cable, the recessed portion being formed near the other end face of the first holding member and around an axis extending in the axis direction.

3. The fixing apparatus according to claim 2, wherein the fixing portion has a hole penetrating the first holding member between its outer peripheral surface and the through hole, the fixing portion being formed near the one end face and exposing out of an end of the wire member.

4. The fixing apparatus according to claim 2, wherein the first holding member has a conical tapered surface formed between its outer peripheral surface and the other end face and tapered in the axis direction from the vicinity of the recessed portion towards the other end face.

5. The fixing apparatus according to claim 1, wherein the optical cable further has a tubular member between the optical fiber and the wire members, the through hole being adapted to receive the optical fiber and the tubular member, the first holding member and the tubular member being fixed by a fixing material supplied to the fixing portion.

6. A fixing apparatus for fixing an optical connector to an optical cable having an optical fiber and wire members arranged around the optical fiber, the fixing apparatus comprising:

a first holding member adapted to be inserted between the wire member and the optical fiber;

a second holding member adapted to be disposed outside the wire members, the second holding member cooperating with the first holding member to tightly hold the wire members therebetween; and a third holding member surrounding the second holding member and having an axial end portion adapted to be engaged with the second holding member in a rotation direction with respect to the optical cable, the third holding member having another axial end portion adapted to be connected to the optical connector, wherein the second holding member has a tubular securing portion for securing an outer peripheral surface of the wire member, a flange portion formed at the other end of the securing portion and integrally connected to the securing portion, and a locking flange portion integrally formed on the other end face of the flange portion.

7. The fixing apparatus according to claim 6, wherein the first holding member has a recessed portion placed between the wire members and the optical fiber to face the wire members, the recessed portion securing the wire member in cooperation with the securing portion.

8. A fixing apparatus for fixing an optical connector to an optical cable having an optical fiber and wire members arranged around the optical fiber, the fixing apparatus comprising:

a first holding member adapted to be inserted between the wire member and the optical fiber;

a second holding member adapted to be disposed outside the wire members, the second holding member cooperating with the first holding member to tightly hold the wire members therebetween; and a third holding member surrounding the second holding member and having an axial end portion adapted to be engaged with the second holding member in a rotation direction with respect to the optical cable, the third holding member having another axial end portion adapted to be connected to the optical connector, wherein the third holding member has a tubular third holding portion, an annular flange portion formed at one end in an axis direction of the optical cable, and a pair of engaged portions having a pin-like shape and protruding from the flange portion in the axis direction.

9. The fixing apparatus according to claim 8, wherein the second holding member having a locking flange portion, the third holding portion has a pair of cutout portions formed by cutting the other end in the axis direction both in a circumferential direction and in the axis direction and a pair of locked portions formed between the cutout portions, the locking flange portion having a pair of flat locking flange surfaces formed on its outer peripheral surface, the locked portions being locked to the locking flange surfaces.

* * * * *